F. LOTTER.
SPRING TIRE.
APPLICATION FILED JULY 6, 1915.
1,174,879.
Patented Mar. 7, 1916.
2 SHEETS—SHEET 1.
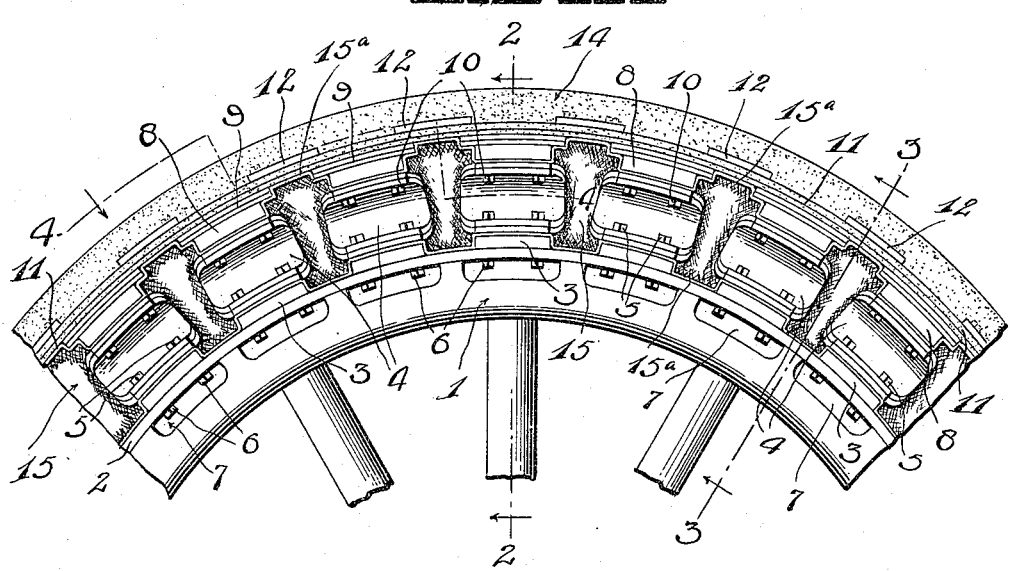
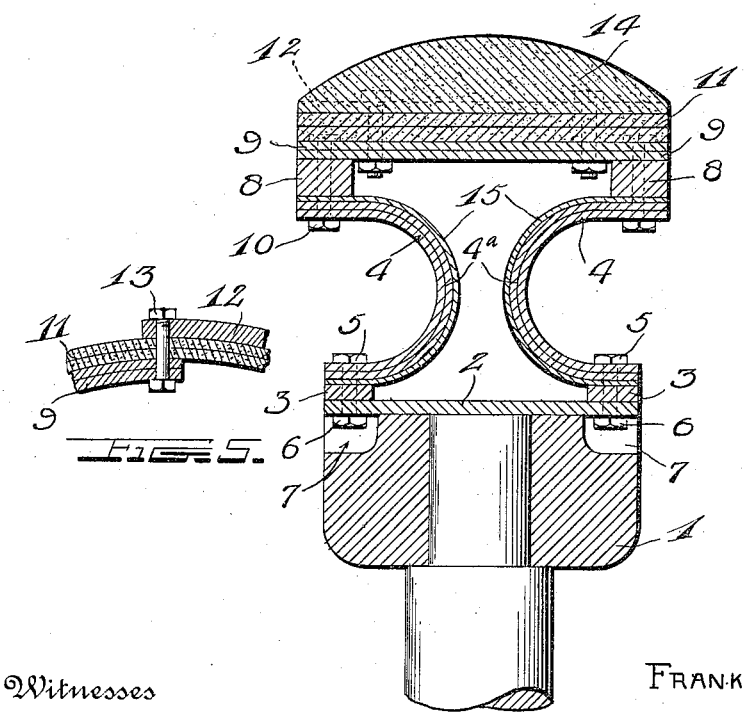
Witnesses
Edwin B. Hunt
Inventor
FRANKLIN LOTTER
By H. B. Willson &Co.
Attorneys F. LOTTER.
SPRING TIRE.
APPLICATION FILED JULY 6, 1915.
1,174,879.
Patented Mar. 7, 1916.
2 SHEETS—SHEET 2.
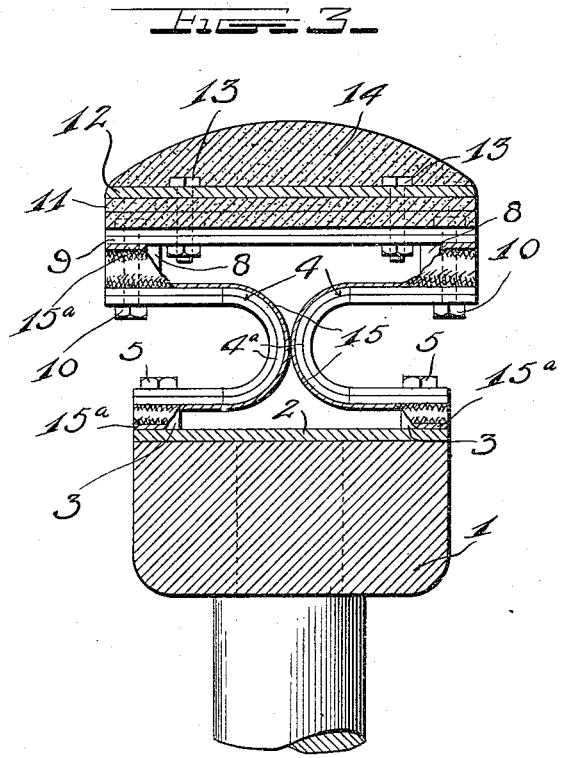
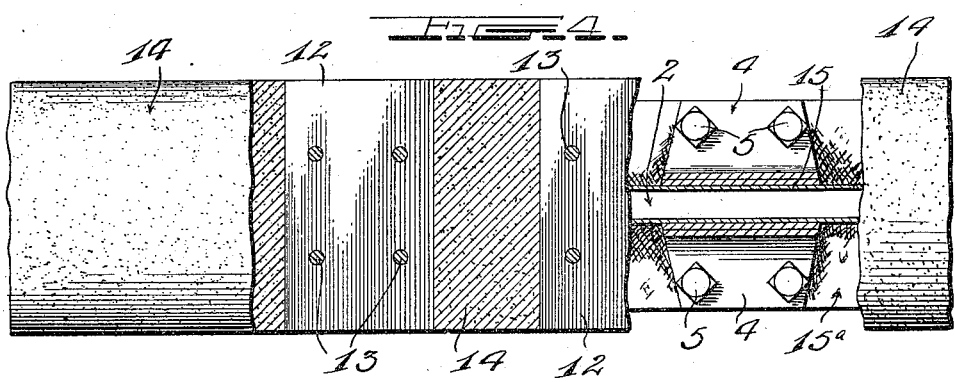
Witnesses
Edwin B. Hunt
Inventor
FRANKLIN LOTTER
By H. B. Willson &co
Attorneys

UNITED STATES PATENT OFFICE.

FRANKLIN LOTTER, OF ELKTON, MICHIGAN, ASSIGNOR OF ONE-THIRD TO AERON CORNELL, OF BAD AXE, MICHIGAN, AND ONE-THIRD TO JOSEPH HEATON, OF ELKTON, MICHIGAN.

SPRING-TIRE.

1,174,879.          Specification of Letters Patent.          Patented Mar. 7, 1916.

Application filed July 6, 1915. Serial No. 38,242.

*To all whom it may concern:*

Be it known that I, FRANKLIN LOTTER, a citizen of the United States, residing at Elkton, in the county of Huron and State of Michigan, have invented certain new and useful Improvements in Spring-Tires; and I do declare the following to be a full, clear, and exact description of the invention, such as will enable others skilled in the art to which it appertains to make and use the same.

My invention relates to useful improvements in vehicle tires and more particularly to those of the type employing a plurality of shock absorbing springs, the object of the invention being to improve upon the general construction of devices of this class to such an extent as to not only provide a tire which may be simply and inexpensively manufactured and marketed, but which will be highly efficient and durable.

To this end, the invention resides in certain novel features of construction and in unique combinations of parts to be hereinafter claimed and fully described by reference to the accompanying drawings wherein:—

Figure 1 is a side elevation of a portion of a tire constructed in accordance with my invention, showing the application thereof to use; Fig. 2 is a transverse section taken on the plane designated by the line 2—2 of Fig. 1, showing the normal positions of the cushioning springs; Fig. 3 is a view similar to Fig. 2 but showing the positions which the springs assume under excessive strain; Fig. 4 is a sectional view taken along the planes designated by the irregular line 4—4 of Fig. 1; Fig. 5 is a detail longitudinal section through a portion of the tread member.

In describing the invention, similar reference characters will be placed on corresponding parts throughout the several views, the numeral 1 having reference to the felly of a vehicle wheel, said felly being surrounded by a rim band 2 which may be secured thereto in any appropriate manner.

Contacting with the outer curved side of the band 2 and disposed in a number of circumferentially spaced transversely alined pairs, is a plurality of spacing blocks 3 adjacent whose outer sides the inner ends of a number of pairs of transversely alined C-shaped cushioning springs 4 are disposed, bolts 5 being passed through said inner ends of the springs 4, through the spacing blocks 3 and the rim band 2, and having nuts 6 on their inner ends disposed in cavities 7 formed in the outer edges of the felly 1. The outer ends of the springs 4 are positioned adjacent the inner sides of a plurality of spacing blocks 8, these blocks being therefore positioned in transversely alined pairs.

Contacting with the outer sides of the blocks 8, is a plurality of parallel transversely disposed flat springs 9 preferably formed of two leaves as are likewise the springs 4. Securing the parts just described in position, is a plurality of bolts 10 which pass through the opposite ends of the springs 9, through the outer ends of the springs 4, and through the intervening spacing blocks 8.

Surrounding and contacting with the series of springs 9, is a band 11 of leather or the like, while contacting with the outer side of said band and disposed in overlapping relation in respect to the springs 9, are additional flat springs 12, bolts 13 being passed through the adjacent ends of the springs 9 and 12, the heads of these bolts being inset in an appropriate tread 14 formed of leather, solid rubber, or other suitable material. By this construction any portion of the tread member 14 may yield inwardly when obstructions in the roadway are encountered, this being allowed by the resilient qualities of the springs 9 and 12 and by the pliability of the band 11. Needless to say, when the parts yield in this manner, the spring units formed by the several pairs of springs 4 absorb the shocks and jars which would otherwise be transmitted directly to the vehicle. Under normal conditions, the bends 4ª of the springs 4 which are disposed toward each other are spaced apart as shown in Fig. 2, but under excessive strain, the springs are so compressed as to cause such bends to abut each other as disclosed in Fig. 3, thus preventing compression to such an extent as to cause breakage.

In addition to the parts above described, a pair of dust rings 15 of leather, canvas or the like, is preferably provided, these rings being positioned between the springs 4 on opposite sides of the wheel and having their inner and outer edges anchored respectively between the inner ends of said springs and the blocks 3, and between the outer ends to said springs and the blocks, the portions of the rings 15 between the several spring units, however, being secured to the bands 2 and 11 as indicated at 15ª. By the provision of the rings in question, the entrance of dust, dirt and the like, between the rim and tread members is prevented.

From the foregoing description, taken in connection with the accompanying drawings, it will be evident that although a comparatively simple and inexpensive construction has been provided for the attainment of the results desired, the complete device will be highly efficient and durable.

In the drawings, certain specific details of construction have been shown for accomplishing probably the best results, and in the foregoing such details have been described, but it is to be understood that I need not be restricted thereto, otherwise than to the extent to which the appended claims limit me.

I claim:—

1. In combination, a rim member, a tread member surrounding and spaced therefrom, and a plurality of spring units interposed between the two members and each comprising a pair of transversely alined C-shaped springs having their ends disposed outwardly and secured to the edge portions of said members, the bends of said springs being disposed adjacent each other in spaced relation and being yieldable inwardly upon compression.

2. In combination, a rim member, a tread member surrounding and spaced therefrom, a plurality of spring units interposed between the two members and each comprising a pair of transversely alined C-shaped springs having their ends disposed outwardly adjacent the edge portions of the aforesaid members, the bends of said springs being disposed adjacent each other, spacing blocks interposed between the ends of the springs and the aforesaid edge portions of the two members, and fasteners passing through the latter, the ends of the springs, and the aforesaid blocks.

3. In combination, a rim member, a tread member surrounding and spaced therefrom, a plurality of spring units interposed between the two members and each comprising a pair of transversely alined C-shaped springs having their ends disposed outwardly and secured to the edge portions of said members, the bends of said springs being disposed adjacent each other, and a pair of flexible shield rings interposed between said members and the adjacent bends of the springs, said rings having their edges anchored adjacent the rim and tread members.

4. In combination, a flat pliable circular band, flat springs disposed in contact with the inner side thereof and spaced circumferentially from each other, additional flat springs disposed in contact with the outer side of said band and having their ends arranged in overlapped relation with the ends of the aforesaid springs, fasteners passing through the adjacent ends of the inner and outer springs and through the intervening band, a tread surrounding the band and the springs on the outer side thereof, a rim member spaced inwardly from said band, and cushioning means interposed between the inner springs and said rim member.

5. In combination, a flat pliable circular band, flat springs disposed in contact with the inner side thereof and spaced circumferentially from each other, additional flat springs disposed in contact with the outer side of said band and having their ends arranged in overlapped relation with the ends of the aforesaid springs, fasteners passing through the adjacent ends of the inner and outer springs and through the intervening band, a tread surrounding the band and the springs on the outer side thereof, a rim member spaced inwardly from said band, and a plurality of spring units disposed one between each of the innermost springs and the rim member.

In testimony whereof I have hereunto set my hand in presence of two subscribing witnesses.

FRANKLIN LOTTER.

Witnesses:
M. L. ACKERMANN,
O. SOELWER.

Copies of this patent may be obtained for five cents each, by addressing the "Commissioner of Patents, Washington, D. C."